United States Patent
Bakema

(10) Patent No.: US 11,681,382 B2
(45) Date of Patent: Jun. 20, 2023

(54) ELECTRONIC STYLUS HAVING IMAGE CAPABILITIES

(71) Applicant: 4th-D Corp., Windsor (CA)

(72) Inventor: Peter Bakema, Denver, NC (US)

(73) Assignee: 4th-D Corp., Windsor (CA)

( * ) Notice: Subject to any disclaimer, the term of this patent is extended or adjusted under 35 U.S.C. 154(b) by 0 days.

(21) Appl. No.: 17/447,498

(22) Filed: Sep. 13, 2021

(65) Prior Publication Data

US 2021/0405779 A1 Dec. 30, 2021

Related U.S. Application Data

(63) Continuation of application No. 16/616,814, filed as application No. PCT/US2018/034599 on May 25, 2018, now Pat. No. 11,126,280.

(60) Provisional application No. 62/511,158, filed on May 25, 2017.

(51) Int. Cl.
| | |
|---|---|
| *G06F 3/0354* | (2013.01) |
| *G06F 1/16* | (2006.01) |
| *H04M 1/02* | (2006.01) |
| *H04L 67/06* | (2022.01) |

(52) U.S. Cl.
CPC ........ *G06F 3/03545* (2013.01); *G06F 1/1656* (2013.01); *H04M 1/026* (2013.01); *H04L 67/06* (2013.01)

(58) Field of Classification Search
CPC . G06F 3/03545; G06F 3/03546; G06F 3/0325
See application file for complete search history.

(56) References Cited

U.S. PATENT DOCUMENTS

| | | | |
|---|---|---|---|
| 5,581,052 A | 12/1996 | Padula et al. | |
| 6,354,754 B1 | 3/2002 | Pan | |
| 6,431,720 B1 | 8/2002 | Cheng | |
| 9,660,477 B2 * | 5/2017 | Dowd | H02J 7/342 |
| 2002/0163511 A1* | 11/2002 | Sekendur | G06F 3/0325 |
| | | | 345/179 |
| 2007/0114367 A1 | 5/2007 | Craven-Bartle et al. | |
| 2008/0044220 A1 | 2/2008 | Hsieh | |
| 2010/0060968 A1 | 3/2010 | Lee | |
| 2015/0331505 A1 | 11/2015 | Vandermeijden et al. | |
| 2016/0034055 A1* | 2/2016 | Utykanski | H02J 7/0044 |
| | | | 235/462.13 |
| 2016/0139691 A1* | 5/2016 | Li | G06F 40/171 |
| | | | 345/179 |

(Continued)

OTHER PUBLICATIONS

International Search Report issued in International Application No. PCT/US2018/034599 dated Aug. 23, 2018.

*Primary Examiner* — Kevin M Nguyen
(74) *Attorney, Agent, or Firm* — Vos-IP, LLC

(57) ABSTRACT

An electronic device comprising a stylus; said stylus comprising a pointed end having a touch capable compression tip, and a top end, said top end comprising a rotatable element disposed of at the end of the top end, comprising a first electronic element mounted on said rotatable element, a second electronic element mounted below said rotatable element; a first contact point and a second contact point disposed on said stylus between said second electronic element and said pointed end; and at least one sensing button; said stylus comprising means for electronically communicating with said electronic device.

4 Claims, 11 Drawing Sheets

(56) References Cited

U.S. PATENT DOCUMENTS

2016/0320868 A1 11/2016 Chang
2017/0068342 A1 3/2017 Zimmerman et al.

* cited by examiner

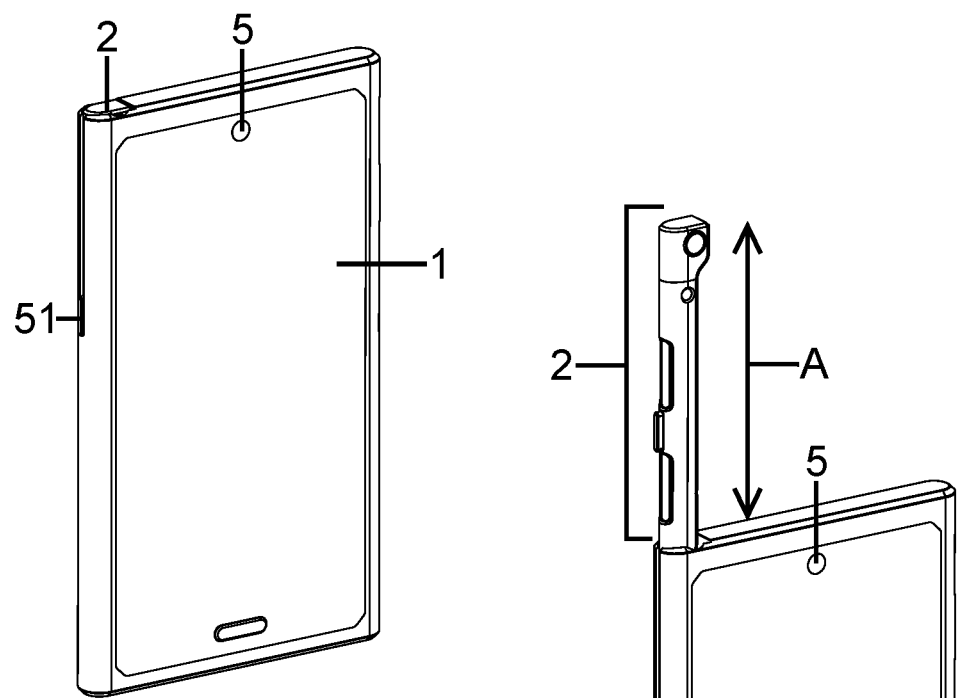
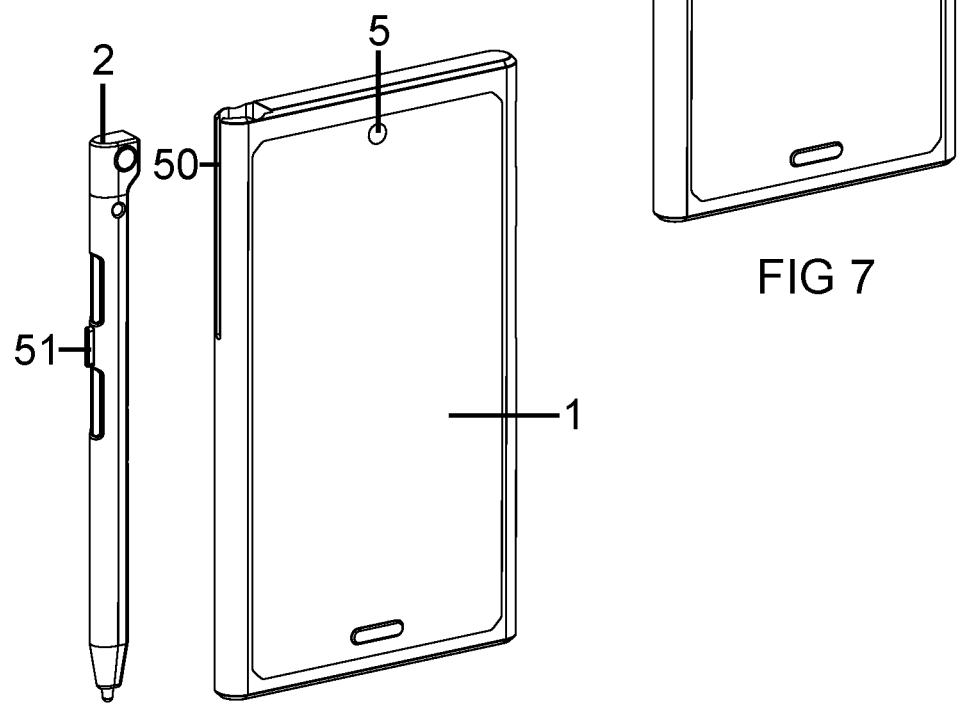
FIG 6
FIG 7
FIG 8

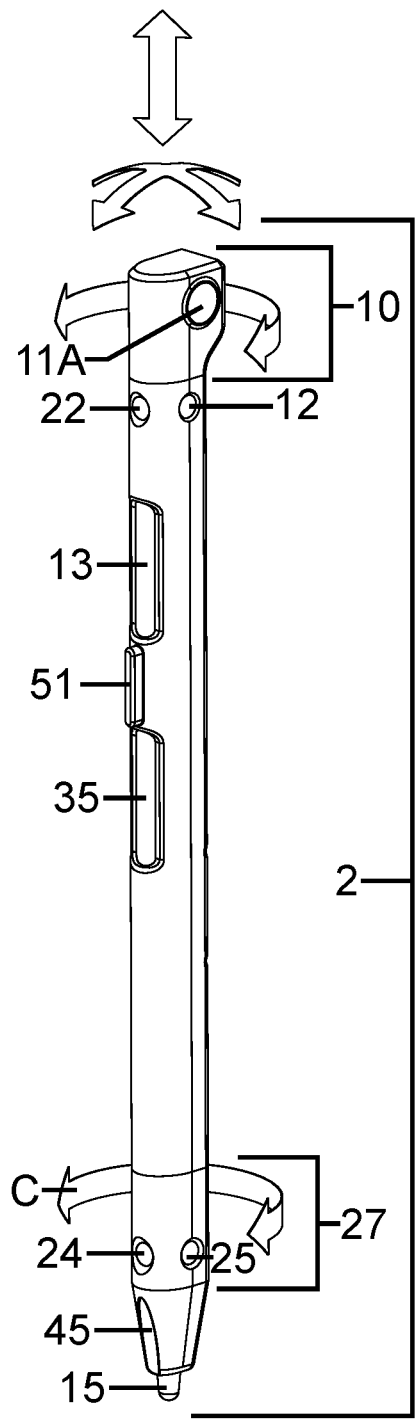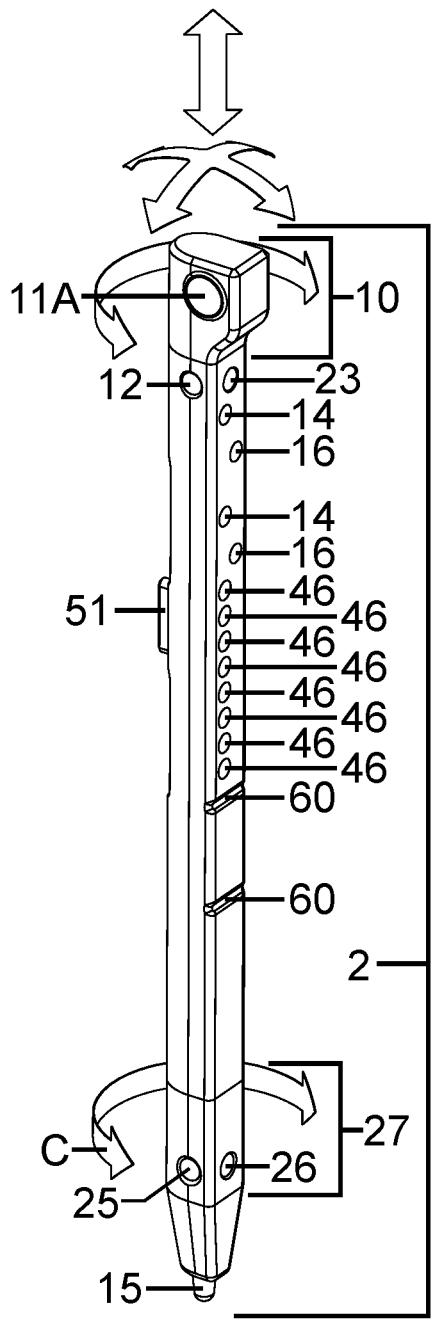
FIG 9
FIG 10

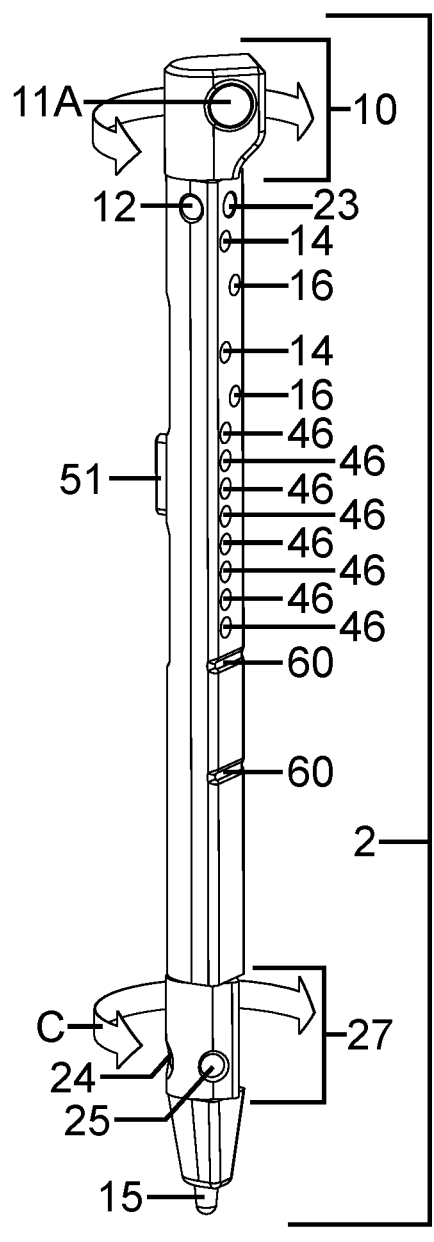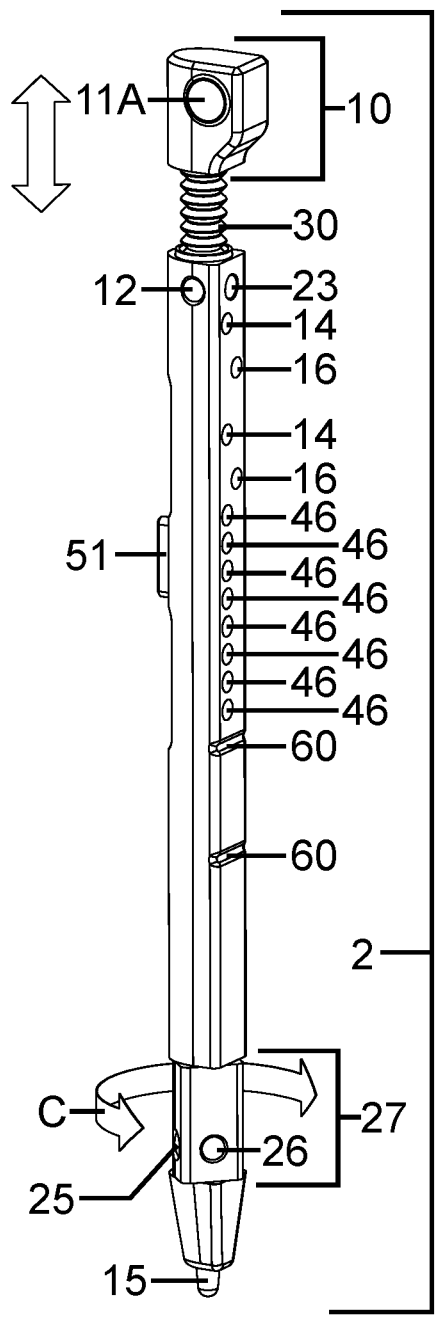
FIG 11
FIG 12

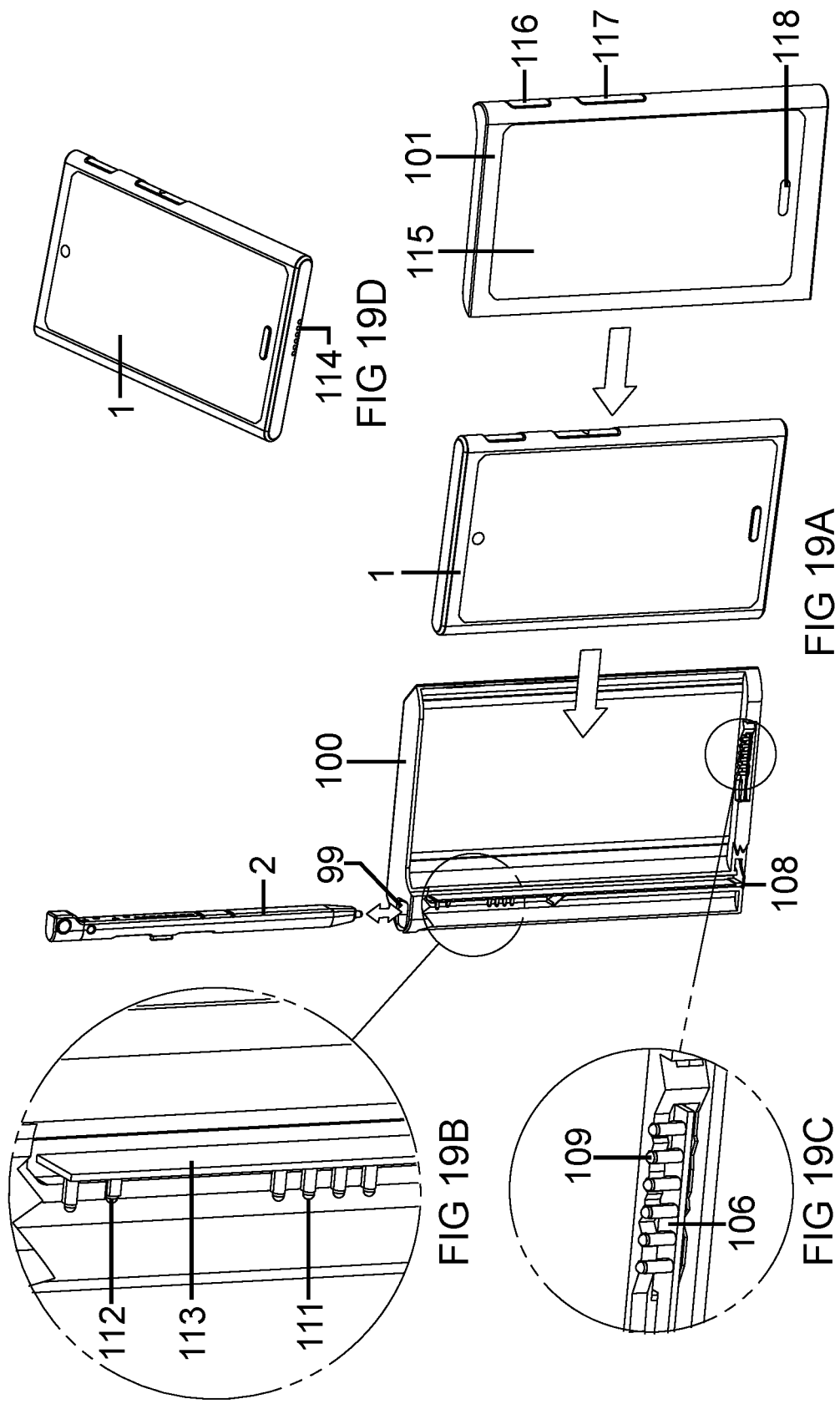

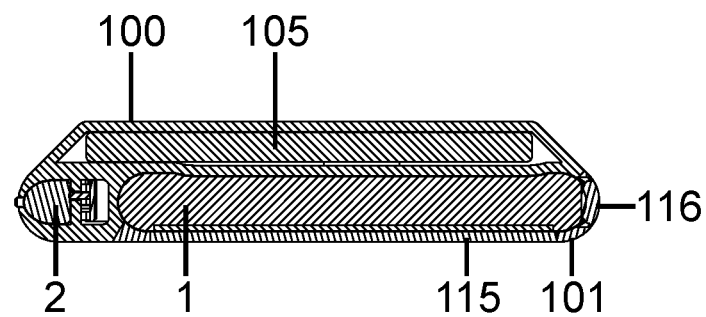
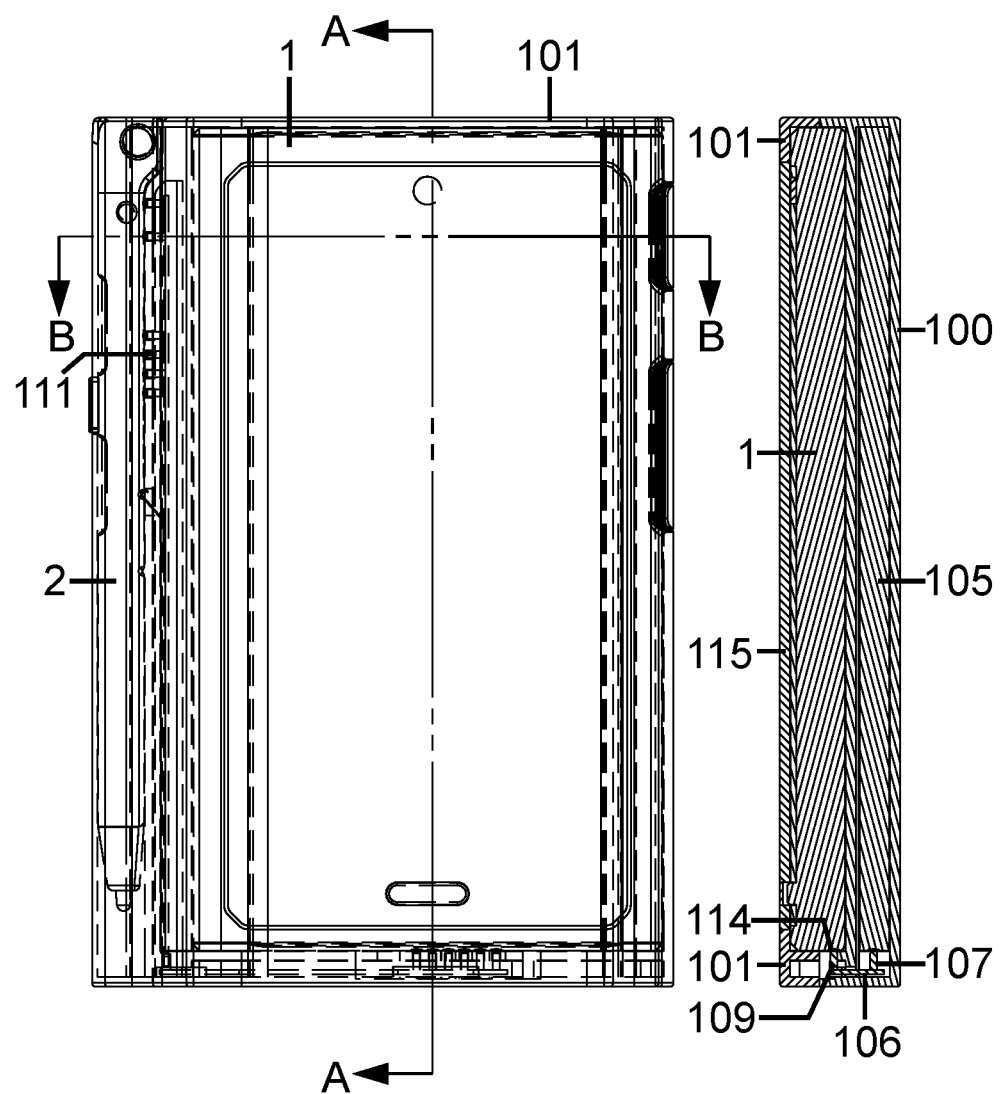

ELECTRONIC STYLUS HAVING IMAGE CAPABILITIES

CROSS-REFERENCE TO RELATED APPLICATIONS

This application is a continuation of U.S. patent application Ser. No. 16/616,814 filed on Nov. 25, 2019, which is a 371 National Phase Entry of International Patent Application No. PCT/US2018/034599 filed on May 25, 2018, which claims the benefit of U.S. Provisional Patent Application No. 62/511,158 filed on May 25, 2017, the contents of which are incorporated herein by reference in their entirety.

FIELD OF INVENTION

The present application is related to a stylus, or further to an apparatus comprising a stylus and an electronic device, wherein said stylus comprises at least one embedded camera and having additional functionality when electronically in communication with said electronic device, and methods for controlling the stylus and electronic device with features on the stylus or the electronic device.

BACKGROUND OF THE INVENTION

Electronic devices, such as touch screen telephones and mobile computers have both included and excluded a stylus. For those inclusive devices, the stylus, while taking up space in the housing, can be a useful tool to impart additional functionality that would be impossible with just the tip of a user's finger, or a regular pencil or pen, without any connectivity to the device.

Even without an embedded stylus, most, if not all, touch screen electronic devices can utilize a stylus. These devices utilize a stylus for enabling handwriting on a tablet, sketching, or for performing additional tasks on the device. However, these devices lack unique functionality that would allow the stylus to be more than just a simple writing implement. As described herein, a novel electronic device, and stylus comprising features allowing a full feature stylus and communication between the electronic device and stylus.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In a preferred embodiment, an electronic device comprising a stylus; said stylus comprising a pointed end having a touch capable compression tip, and a top end, said top end comprising a rotatable element disposed of at the end of the top end, comprising a first electronic element mounted on said rotatable element, a second electronic element mounted below said rotatable element; a first contact point and a second contact point spaced between said second electronic element and said pointed end; and at least one sensing button; said stylus comprising means for electronically communicating with said electronic device. The electronic device wherein said first electronic element on said stylus is selected from the group consisting of a camera and a light, or combinations thereof. In preferred embodiments, said second electronic element on said stylus is selected from the group consisting of a camera and a light, or combinations thereof.

A preferred embodiment is directed towards a stylus comprising a plurality of cameras and sensors, having the ability to wirelessly communicate with a parent device, wherein an application run on both the stylus and the parent device identifies features and how to engage such features through said wireless communication.

A stylus comprising at least one camera and at least one infrared camera. In further embodiments, the stylus further comprising at least one sensor and at least a second camera oriented on a different plane than said at least one camera.

A stylus comprising at least one camera, at least one laser pointer extending from one end of said stylus, and at least one receiver; wherein said receive is capable of detecting a reflection of said laser from a distance and wherein said stylus can determine and calculate distance.

A stylus engaged to a parent device, wherein said stylus has a first position, flush to said parent device, a second position, extended from said device, but in in electrical communication, and a third position disengaged from said parent device and in wireless communication between said parent device; said stylus comprising a tip end and an opposing end, said tip end capable of engaging to a surface on said parent device for electronically writing on said surface, and said opposing end comprising components to engage to said parent device, at least one camera positioned between said tip end and said opposing end.

The stylus wherein the opposing end comprises a rotatable feature, capable of rotating 360 degrees around the longitudinal axis of the stylus and comprising at least one feature on said rotatable feature. The stylus wherein said at least one feature is a camera. The stylus device further comprising at least a second camera. The stylus device further comprising at least an electronic sensing device, wherein said sensing device can serve as a button or selection device. The stylus device wherein said tip end is positioned on a rotatable element, such that said tip can rotate 360 degrees around the longitudinal axis of the stylus. The stylus device wherein said tip end is positioned on a rotatable element, such that said tip can rotate 360 degrees around the longitudinal axis of the stylus. The stylus device, wherein each of said rotatable ends comprises at least one electronic feature, said electronic feature selected from the group consisting of a camera, a button, a selection device, a light, a sensor, or combinations thereof.

A stylus of any one of the preceding comprising a plurality of camera devices, wherein said camera devices are capable of being positioned on said stylus to capture an image at a single moment in 360 degrees, by combining the simultaneous images from said plurality of camera devices.

A stylus of any one of the preceding comprising at least one camera at a tip end and at least a second camera the opposing end and comprising at least one selection device or button and at least one light. The stylus wherein at least one of the cameras is able to be rotated 360 degrees and wherein each of the cameras can be actuated by compression of the at least one selection device or button on the stylus, or wherein the cameras can be actuated (shutter released) from the parent device.

The stylus device of any one of the preceding wherein the stylus and parent device communicate are in fluid communication, wherein the stylus communicates to the parent device and the parent devices communicates to the stylus to relay instructions for a certain action or to transfer data.

The stylus device of any one of the preceding wherein at least one camera is an infrared camera.

The stylus device of any one of the preceding wherein the stylus is compliant with at least IP67 standard for water resistance; and preferably at least IP68.

The stylus device of any one of the preceding wherein a plurality of cameras allows for virtual reality images to be captured and displayed on a display.

The stylus device of any one of the preceding wherein at least one display is provided on said stylus.

The stylus device of any one of the preceding wherein at least two displays are contained on said stylus.

The stylus device of any one of the preceding wherein the device comprises memory, a processor, wireless connectivity means, wired connectivity means, and a battery.

An electronic system comprising a parent device and a stylus, wherein said parent device comprises a dock for accepting said stylus and contains at least one communication means so as to communicate between said parent device and said stylus, wherein an application is provided on each of the parent device and said stylus to allow for communication between said devices and wherein said application allows the stylus to control features on the parent device though the communication means.

The system wherein the at least one communication means comprises an electronic contact within said port, and a corresponding contact is provided on said stylus to allow for electronic communication between the parent device and said stylus.

The electronic system wherein the at least one communication means comprises wireless connectivity, and wherein each device comprises necessary components to send and receive wireless communications.

The electronic system further comprising a second communication means, wherein said second communication means comprises wireless connectivity, and wherein each device comprises necessary components to send and receive wireless communications.

The system further comprising any of the features of the stylus or parent device as described herein.

In a preferred embodiment, an electronic device comprising a stylus; said stylus comprising a pointed end having a touch capable compression tip, and a top end, said top end comprising a rotatable element disposed of at the end of the top end, comprising a first electronic element mounted on said rotatable element, a second electronic element mounted below said rotatable element; a first contact point and a second contact point disposed on said stylus between said second electronic element and said pointed end; and at least one sensing button; said stylus comprising means for electronically communicating with said electronic device.

The electronic device, wherein said first electronic element on said stylus is selected from the group consisting of a camera and a light, or combinations thereof. The electronic device, wherein said second electronic element on said stylus is selected from the group consisting of a camera and a light, or combinations thereof.

The electronic device wherein said device comprises an opening for receiving said stylus; and disposed of within said open are a first and second connection point for electronically connecting to said first and second contact points on said stylus.

The electronic device wherein said stylus comprises at least one notch between said touch capable compression tip and said top end; said notch having a corresponding latch component within said opening. The electronic device wherein said stylus comprises at least two notches between said touch capable compression tip and said top end.

The electronic device, wherein said rotatable element is connected to the stylus via a flexible and extendable structure (an accordion like structure), said flexible and extendable structure allowing rotation of said rotatable element and extension of said rotatable element.

A further embodiment is directed towards a stylus having a body having a tip end and a head end, said head end being a rotatable element, connected to said stylus body via an accordion like structure, enabling the rotatable element to extend away from said body and rotate 360 degrees; said rotatable element comprising at least one electronic element selected from a camera, a sensor, or a light; said body comprising at least a second electronic element positioned on the body below the rotatable element; said second electronic element selected from a camera, a sensor, or a light; and at least one activating switch, positioned on said body, said activating switch capable of activating one or both of the first and second electronic elements; said body of said stylus comprising at least two electrical contact; wherein said stylus is communicatively coupled to an electronic device.

The stylus wherein said communicatively coupling is performed by direct connection between at least one of the two electrical contacts and a connector on an electronic device. The stylus wherein said communicatively coupling is performed by wireless connection between said stylus and an electronic device.

The stylus comprising at least a third electronic element, wherein said second electronic element is positioned adjacent to said rotatable element on one end of the stylus body and said third electronic element is positioned adjacent the tip and the opposing end of the body; wherein said second and third electronic elements are positioned inline with one another on said body. The stylus, wherein said second and third electronic elements are both cameras, and wherein said second and third electronic elements are capable of simultaneous capture of an image; which said image can be combined to generate combined photos from both cameras. The stylus, wherein one of the cameras is an infrared camera.

The stylus further comprising at least one sensor and at least two cameras, wherein a first camera and a second camera are oriented on different planes along said stylus.

The stylus comprising at least one camera, at least one laser pointer extending from said tip end, and at least one receiver positioned on said body; wherein said receiver is capable of detecting a reflection of said laser from a distance and wherein said stylus can determine and calculate distance.

In a further embodiment, a stylus engaged to an electronic device, said stylus having an elongated body having a first tip end and a second head end, said head end comprising a rotatable element comprising at least one electronic element selected from a light, a camera, or a sensor; and along said elongated body is positioned at least one electronic contact at least one activating switch; wherein said electronic device comprises a top, two sides, a bottom, a front and back, wherein one side comprises a receiving aperture capable of accepting said stylus; within said receiving aperture is at least one contact point; said stylus has a first position, wherein said head end is flush to said electronic device top, and at least a second position, wherein said head end is extended from said device, and remains in electronic communication with said electronic device, and a third position disengaged from said parent device and in wireless communication between said stylus and said electronic device.

The stylus device, wherein said rotatable element is connected to said elongated body via an accordion like structure, said accordion like structure capable of rotating 360 degrees around the longitudinal axis of the stylus. The stylus device wherein said at least one electronic element is a camera.

The stylus device, further comprising at least a second electronic element, wherein said at least second electronic element is a camera.

The stylus device wherein said tip end is positioned adjacent to a second rotatable element, and wherein said second rotatable element comprises at least a second electronic element.

The stylus device, wherein each of said electronic feature is selected from the group consisting of a camera, a button, a selection device, a light, a sensor, or combinations thereof.

A further embodiment is directed towards an electronic system comprising a parent device and a stylus, wherein said parent device comprises a dock for accepting said stylus and contains at least one communication means so as to communicate between said parent device and said stylus, wherein an application is provided on each of the parent device and said stylus to allow for communication between said devices. In certain embodiments, the system, wherein the at least one communication means comprises an electronic contact within said port, and a corresponding contact is provided on said stylus to allow for electronic communication between the parent device and said stylus. In certain embodiments, the system, wherein the at least one communication means comprises wireless connectivity, and wherein each device comprises necessary components to send and receive wireless communications. In certain embodiments, the system, further comprising a second communication means, wherein said second communication means comprises wireless connectivity, and wherein each device comprises necessary components to send and receive wireless communications.

A stylus of any one of the preceding embodiments comprising a plurality of cameras on said stylus, wherein said plurality of cameras are capable of being positioned on said stylus to capture an image at a single moment in 360 degrees, by combining the simultaneous images from said plurality of camera devices.

A stylus of any one of the preceding embodiments comprising at least one camera at a tip end and at least a second camera the head end and comprising at least one selection device or button and at least one light. The stylus wherein at least one of the cameras is able to be rotated 360 degrees and wherein each of the cameras can be actuated by compression of the at least one selection device or button on the stylus, or wherein the cameras can be actuated (shutter released) from the parent device.

The stylus device of any one of the preceding embodiments, wherein the stylus communicates with a parent device (an electronic device).

The stylus device of any one of the preceding embodiments, wherein the stylus and parent device communicate in each direction, wherein the stylus communicates to the parent device and the parent devices communicates to the stylus.

The stylus device of any one of the preceding embodiments wherein at least one camera is an infrared camera.

The stylus device of any one of the preceding embodiments wherein the stylus is waterproof The stylus device of any one of the preceding embodiments wherein a plurality of cameras allows for virtual reality images to be captured and displayed on a display.

The stylus device of any one of the preceding embodiments wherein at least on display is provided on said stylus.

The stylus device of any one of the preceding embodiments wherein at least two displays are contained on said stylus.

The stylus device of any one of the preceding embodiments wherein the device comprises memory, a processor, wireless connectivity means, wired connectivity means, and a battery.

A further embodiment is directed towards a stylus, coupled to a parent electronic device; said stylus comprising an elongated body having a first tip end and second head end; said head end comprising at least one electronic element; said elongated body comprising at least one actuation button; and at least one connection point; wherein said head end is a rotatable element; connected to said elongated body wherein said rotatable element is capable of rotation around the longitudinal axis of the elongated body. In an embodiment, the stylus further comprising at least a second electronic element. In an embodiment, the stylus, wherein said at least a second electronic element is positioned on said rotatable element or on said elongated body. In an embodiment, the stylus comprising at least a third electronic element. In an embodiment, the stylus wherein said parent electronic device comprises an aperture for receiving said stylus. In an embodiment, the stylus, wherein within said aperture is at least one connector; said at least one connector capable of electronic communication with said at least one connection point.

BRIEF DESCRIPTION OF THE FIGURES

FIG. 6 depicts an electronic device with an embedded stylus operatively coupled to said electronic device.

FIG. 7 depicts the stylus device of FIG. 6 in a second position, with the stylus still operatively coupled to said electronic device.

FIG. 8 depicts a stylus disengaged from an electronic device.

FIG. 9 depicts a stylus having a rotatable head and a rotatable tip.

FIG. 10 depicts an opposing side of the stylus of FIG. 9.

FIG. 11 depicts a variation of a stylus.

FIG. 12 depicts a stylus having an accordion like head.

FIGS. 19A-19D depict a case overlapping an electronic device.

FIGS. 20, 20A, and 20B depict various cross-sectional views of a battery case for an electronic device.

DETAILED DESCRIPTION OF THE INVENTION

Figure 1:
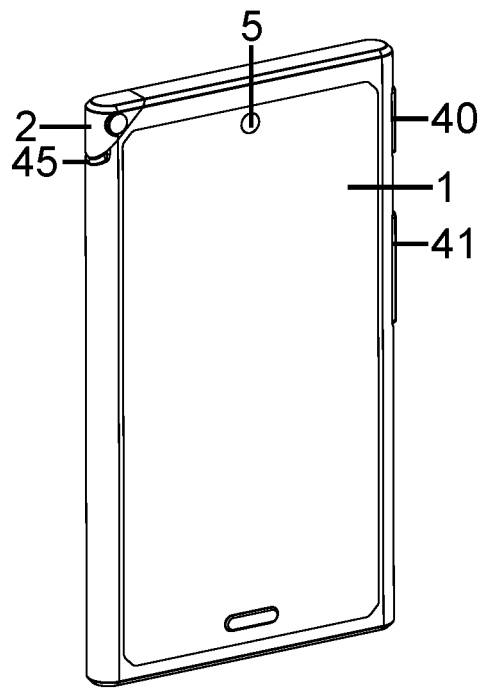
FIG. 1 shows an example of an embodiment of an electronic device having a stylus in an embedded or flush position.

It is to be understood that the singular forms "a," "an," and "the" include plural referents unless the context clearly dictates otherwise. Thus, for example, reference to "a component surface" includes reference to one or more of such surfaces.

In the present disclosure, the terms are used to describe specific embodiments of the present disclosure and are not intended to limit the present disclosure. As used herein, the singular forms are intended to include the plural forms as well, unless the context clearly indicates otherwise. In the description, it should be understood that the terms "include" or "have" indicate existence of a feature, a number, an operation, a structural element, parts, or a combination thereof, and do not previously exclude the existences or probability of addition of one or more another features, numeral, operations, structural elements, parts, or combinations thereof.

In the present disclosure, the expression "A or B," "at least one of A or/and B," or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first," "a second," "the first," or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

When it is mentioned that one element (e.g., a first element) is "(operatively or communicatively) coupled with/ to or connected to" another element (e.g., a second element), it should be construed that the one element is directly connected to the another element or the one element is indirectly connected to the another element via yet another element (e.g., a third element) by a mechanical, electrical, or magnetic contact, for example one suitable to transmit data. In contrast, it may be understood that when an element (e.g., the first element) is referred to as being "directly connected," or "directly coupled" to another element (second element), there are no element (e.g., the third element) interposed between them.

The expression "configured to" used in the present disclosure may be exchanged with, for example, "suitable for," "having the capacity to," "designed to," "adapted to," "made to," or "capable of" according to the situation. The term "configured to" may not necessarily imply "specifically designed to" in hardware. Alternatively, in some situations, the expression "device configured to" may mean that the device, together with other devices or components, "is able to." For example, the phrase "processor adapted (or configured) to perform A, B, and C" may mean a dedicated processor (e.g., an embedded processor) only for performing the corresponding operations or a generic purpose processor (e.g., a central processing unit [CPU] or an application processor [AP]) that can perform the corresponding operations by executing one or more software programs stored in a memory device.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art and are not to be interpreted to have ideal or excessively formal meanings unless clearly defined in the present specification. In some cases, even the term defined in the present disclosure should not be interpreted to exclude embodiments of the present disclosure.

In the present disclosure, an electronic device may be called a terminal, a portable terminal, a mobile terminal, a communication terminal, a portable communication terminal, a portable mobile terminal, a display device, and the like. For example, the electronic device may be a smartphone, a portable phone, a game player, a television (TV), a display unit, a heads-up display unit for a vehicle, a notebook computer, a touch screen computer or computing device, a laptop computer, a tablet personal computer (PC), a personal media player (PMP), a personal digital assistants (PDA), a charging device used to operatively connect to a second device for providing additional power reserves or charging of the second device, and the like. The electronic device may be implemented as a portable communication terminal which has a wireless communication function and a pocket size. Further, the electronic device may be a flexible device or a flexible display device. In certain embodiments, the electronic device is described as a "mobile computing device" which includes smartphones, a portable phone, or tablet PC like the iPad and similar style devices.

The electronic device may communicate with an external electronic device, such as a server, and the like, or perform an operation through an interworking with the external electronic device. For example, the electronic device may transmit an image photographed by a camera and/or position information detected by a sensor unit to the server through a network. The network may be a mobile or cellular communication network, a local area network (LAN), a wireless LAN (WLAN), a wide area network (WAN), an Internet, a small area network (SAN), Bluetooth, IrDA, home Rf, WiFi, SWAP, and the like, but is not limited thereto.

Figure 3:
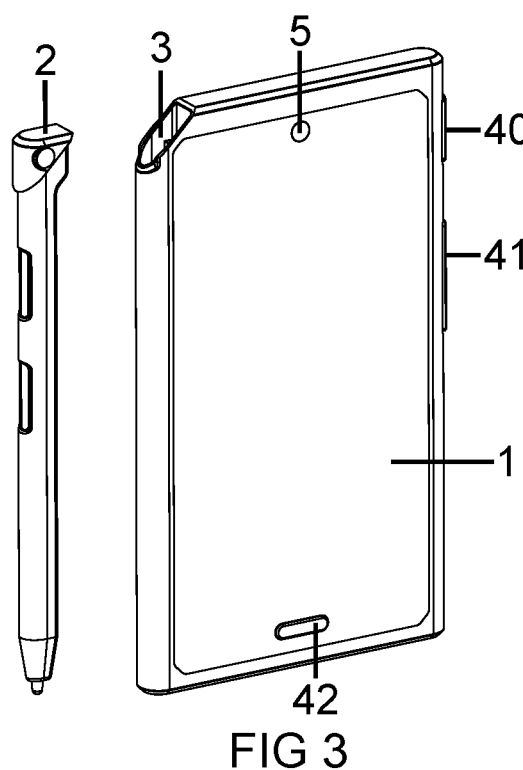
FIG. 3 depicts a stylus disengaged from an electronic device.

Referring to FIG. 1 an electronic device (1) comprising an embedded camera (5), a first toggle button (40) and a second toggle button (41), and a home button (42), identified in FIG. 3. On the left side of the device is a stylus (2), with a notch (45) in the case of the electronic device for removing said stylus (2).

Figure 2:
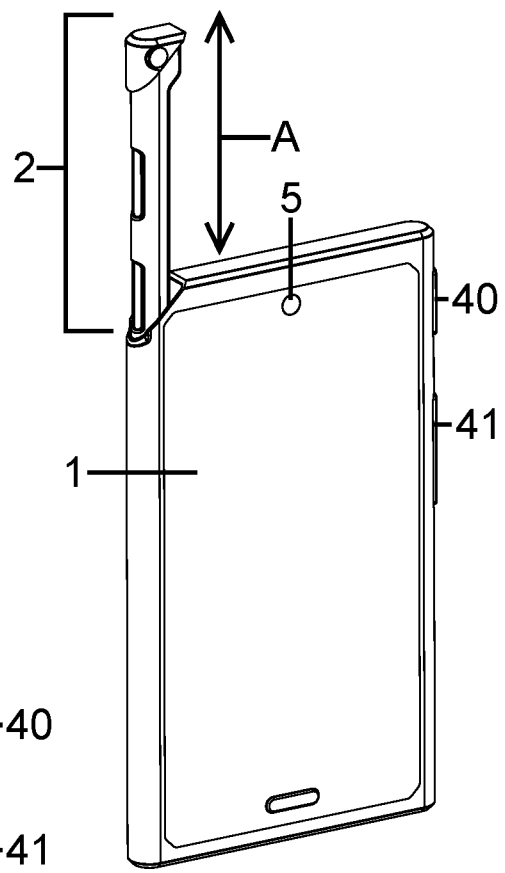
FIG. 2 depicts a stylus within an electronic device in an extended position, but operatively coupled to said electronic computing device.

FIG. 2 depicts the device of FIG. 1 in a second position, with the stylus (2) removed from the body of the electronic device (1) in the direction of "A", wherein the stylus (2) can be depressed back into the body of the electronic device, as in FIG. 1 or be completely removed from the stylus opening (3), as depicted in FIG. 3. Indeed, the FIGS. 1-3 depict an embodiment having three positions, a fully recessed or flush stylus in FIG. 1, a partially removed stylus in FIG. 2, and a detached stylus in FIG. 3. Once removed from the electronic device (1), the stylus (2) is configured to wirelessly engage with the electronic device (1) to allow for the stylus (2) to control certain features on the electronic device (1).

Figure 4:
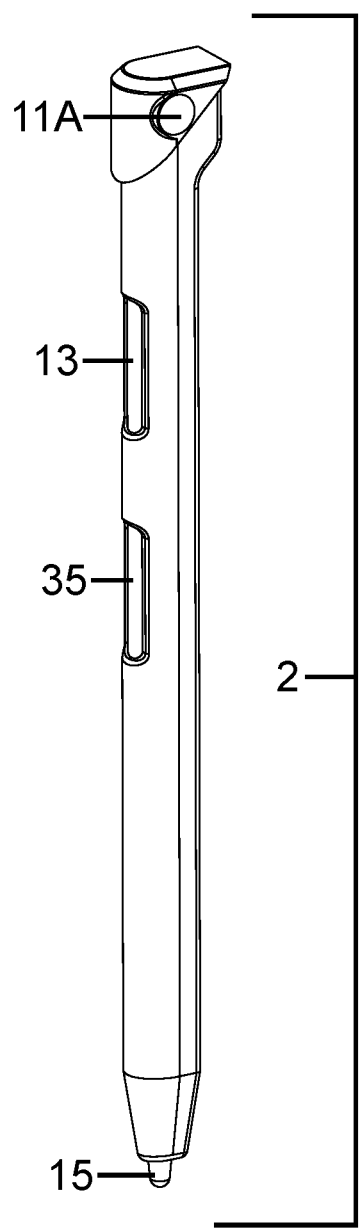
FIG. 4 depicts a stylus.

FIG. 4 depicts detail of a stylus (2). The stylus (2) comprises a first electronic element (11A) positioned on one end of the stylus (2). A tip (15) is positioned at the opposing end of the stylus (2). The tip (15) can be a capacitive stylus (2), to be used with a capacitive screen, to conduct between the stylus and the screen. A resistive stylus can be used on a resistive screen that imparts pressure to the screen. Between the two ends are positioned a first electronic switch (13), and a second electronic switch (35). These electronic switches may be a compressible button, a touch sensitive button, an electronic communication component, or the like. These switches (13) and (35) are intended in preferred embodiments to function as a button or selector device, to allow for selection or election of a feature, either on the stylus (2) itself or on the electronic device (1), to which the stylus (2) is electronically coupled.

Figure 5:
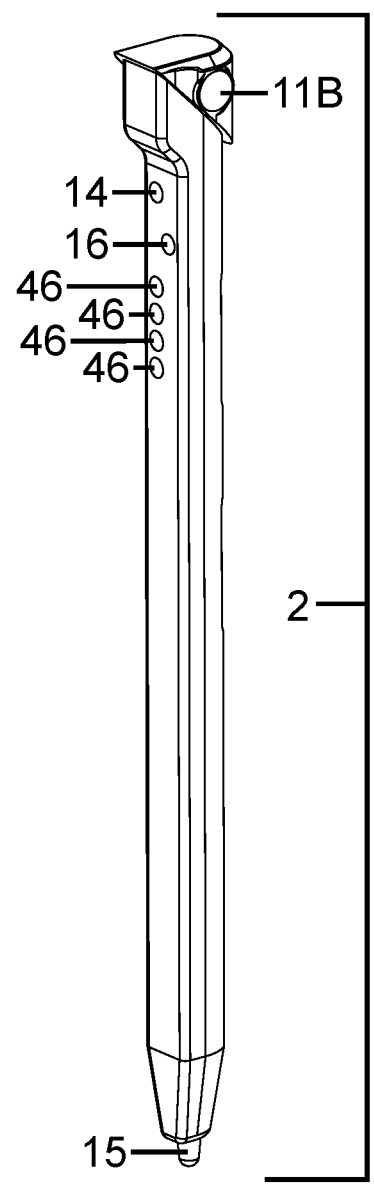
FIG. 5 depicts a further view of the stylus of FIG. 4, depicting a second electronic component on the opposing side of the head.

FIG. 5 depicts the opposing side of the stylus (2) of FIG. 4, wherein the tip (15) is at one end and the head on the other end. A second electronic element (11B) is positioned on the other side of the first electronic element (11A). The back side of the length of the stylus (2) comprises several connection points (14, 16, and 46 [four points]). These connection points are configured to correspond to connections within an electronic device, wherein the various connection points create a fingerprint to identify the relative position of the stylus and to allow for communication between the stylus and the electronic element. In preferred embodiments, these connection points can be selected from electronic connections, magnetic connections, mechanical connections and the like.

Referring to FIGS. 6-8, depict a variation of FIGS. 1-3, with a different mechanism in the electronic device for removing the stylus (2). A protrusion (51) is placed on one side of the stylus that functions to slide through track (50) within the side of the electronic device (1). Thus when inserting the stylus (2), into the stylus opening, the stylus is properly oriented by positioning the protrusion (51) into the track (50).

FIG. 9 provides a further embodiment of a stylus (2), suitable for inserting into a mobile computing device (1), having a top mounted rotatable component (10). As depicted, the stylus (2) comprises a top mounted rotatable component (10), which comprises an electronic element (11A). The electronic element (11A) can be a camera, a light, a laser pointer, an antenna, infrared camera, black light, laser pointer, LED, button, sensor, touch sensor, micro display, reader, or another electronic element. The rotatable component (10) rotates both around the longitudinal axis of the stylus, as well as flexes to the sides, as shown by the arrows. This allows for a free moving rotatable component (10) to allow for orienting the electronic element (11A) into different positions.

Below to rotatable element (10) is provided two additional electronic elements (12 and 22). Like the electronic element (11A), these too can be any number of electronic features, as listed above, however these are positioned in a static space on the sides of the stylus. The rotatable component (10) has at least one electronic element (11A), however, as depicted in other figures, a second electronic element (11B) may be on an opposing side. With three electronic elements, for example, you can have one functioning as a camera in the visible spectrum, one as a light, and one as a UV camera. Any further combinations are possible. Specifically, two or three visible light cameras can be utilized together and provide for panoramic images, 3D images, and the like. Indeed, it is possible to utilize four, or more cameras at a single instance, wherein the stylus can simultaneously take four photos at once and post process them into a single image. This might allow for different focal lengths to be used at a given time, giving a greater depth of field image, or taken to give a single panoramic image, as nonlimiting examples.

At the tip of the stylus (2), the tip can also rotate, at feature (27) along path C. This allows the tip components, for example (24, 25, and 26), to rotate into a position for use. For example, (24, 25, and 26) are tip electronic elements, and like the electronic elements at the base of the stylus, can be any number of features. Together, this provides that one can also take images from both the tip and also the base of the stylus. Thus, the stylus may be held vertical and images taken from element (11A) and from (24) at the same time, giving different plane orientations for taking an image. Or the two elements may be combined together to create a panoramic or other image that combines the two images together. Those of skill in the art recognize the ability to stitch together two or more images to create depth of field, detail, panoramic images, or images that detail visual and UV or other light sources.

The rotatable camera on electronic element (10) is positioned on a pin, having accordion feature (30) and rotates, as indicated in FIG. 9. Thus, when the stylus (2) is held by a user, the user can completely rotate the rotatable element (10) to take an image, where a camera is utilized in such embodiment, or to use it as a light, or whatever feature is utilized in such rotatable element (10). This is even more advantageous when the rotatable component (10) is maintained inside of the stylus opening (3), with just the rotatable component (10) extending above. Indeed, by extending the rotatable element (10), just above the top of the electronic device (1), the rotatable element (10) can benefit from the power and processing power of the electronic device (1) itself.

The various engagement buttons, e.g., (13 or 35), can have several features for the stylus. These buttons can be compressible, having a click like feature to engage, can be an electronic button, just requiring touch to activate, or the like. These components (13 and 35), can have several features and several different uses. First, each can be utilized to communicate with internal components of the device to identify the position of the sensor. This enables the electronic device (1) to determine whether to open an app for use of the stylus, or to defer to the stylus for taking of an image.

Furthermore, each of the buttons (13 and 35) can function as a shutter release, e.g., for a lens (11A) or a second element (12) (or other elements) that is a camera. Of course, if one of these features is a light, or flash, the button can serve to illuminate the light or to initiate the flash. Software can be utilized to program the particular function of each component of the stylus (2).

FIG. 9 further details a receiver (45) that is positioned at the base of the stylus (2). This receiver (45) may be optionally included to receive UV, IR, visible light, or laser light from a second surface. For example, an electronic element (24) may be a laser light and shine a light to an adjacent surface. The receiver (45) can allow the computation of distance between the stylus (2) and the second surface. Alternatively, the tip (15) may comprise an electronic emitter, and such emission can be detected by the receiver (45). However, those of skill in the art will also recognize that cameras generally possess the ability to detect distance as well, by detecting a light source and the time for it to contact the sensor of a camera.

However, the purpose of such receiver (45) is specifically for distance measuring. For example, the stylus can be used to precisely measure distance from the stylus to a fixed point. In many construction instances, such a capability could replace additional tape measures or specific laser distance measuring devices, with the attached component.

In a preferred embodiment the tip (15) provides a laser feature. In the simplest forms, this feature can be a laser pointer as known to those of ordinary skill in the art. However, more advanced circuitry is provided, wherein the laser is captured by one or more sensors on the device, e.g., face (45), which receives a reflected laser and can be utilized to measure distance. For example, the laser can be pointed at an opposing wall, and the device would calculate the precise distance between the stylus and the opposing wall. Applications on the stylus or the electronic device can then project the distance either visually on an app, e.g., on a micro display, or on the body of the electronic device, or audibly. For example, one of the features, e.g., (13), as one nonlimiting example, may be a speaker to audibly provide the distance.

Furthermore, the laser can be utilized with the receiver (45) to determine speed of an object, similar to a radar gun. The laser and the stylus tip (15) can also be utilized to calculate certain distances on both paper maps and also on electronic maps. For example, the stylus can detect and determine distances on a map through a given legend. Then by tracing between a first point and a second point, the precise distance can be calculated from a map. For example, in a topographical map, an adventurer could identify the precise distance between herself and a second point by tracing the distance. In further embodiments, the tip can be compressed or placed on a first point, and then compressed or placed on a second point, and the distance calculated between. Appropriate software can be utilized to allow for the functionalities described herein based upon the hardware device provided. Furthermore, appropriate methods of use of the stylus can be conceived based upon these nonlimiting examples.

FIG. 10 provides detail of the back side of the stylus of FIG. 9, including plurality of connection points (14, 16, and 46). As provided above, these connection points enable the stylus (2) to communicate with an electronic device to identify position of the device, and to communicate or transfer information between the stylus and the electronic device. Further, a further electronic element (23) is depicted adjacent to electronic element (12). As above, this allows for electronic elements to be placed on each side of the stylus (2).

Figure 16A:
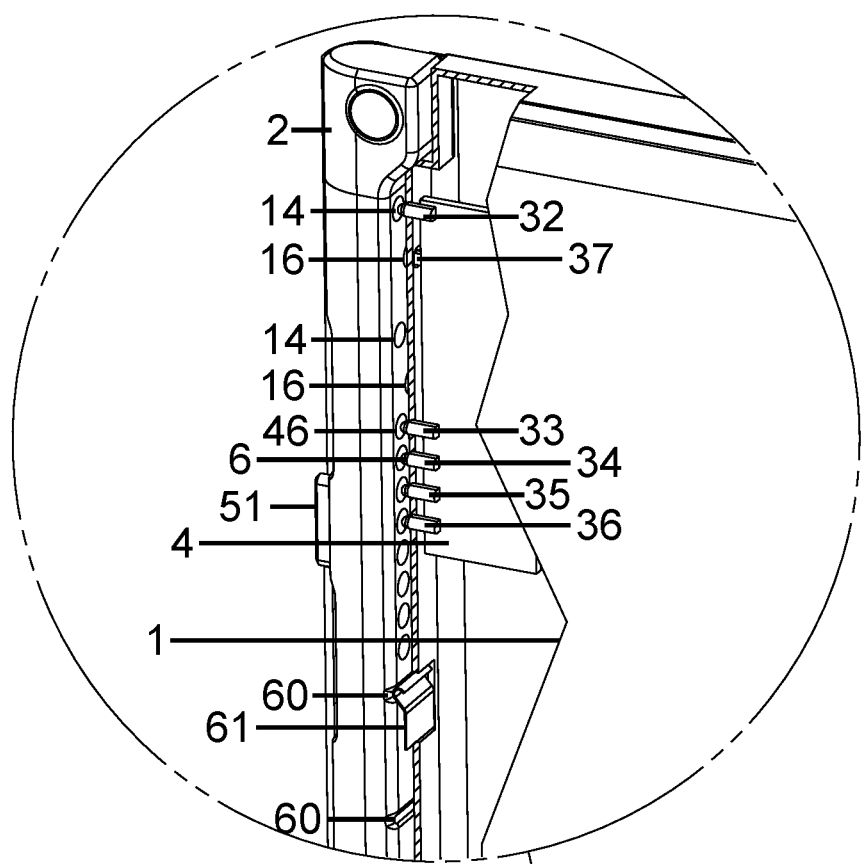
FIGS. 16A and 16B depict a closeup of an electronic device and the internal components that operatively communicate between the stylus and the electronic device.
Figure 16B:
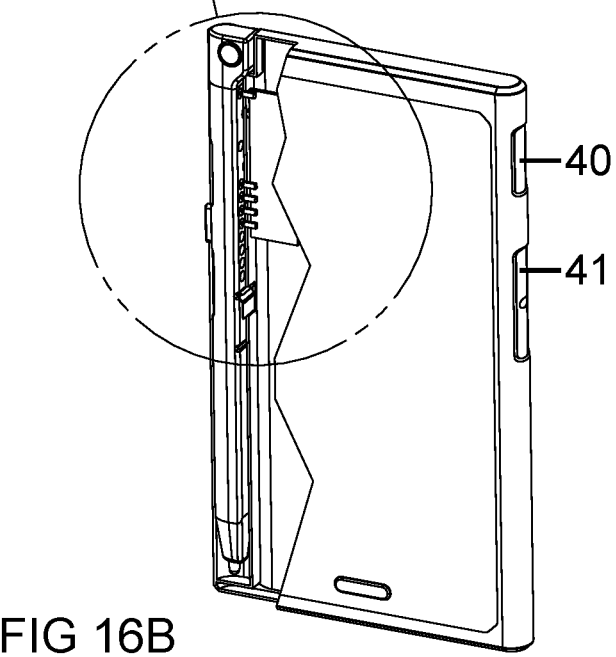

Further depicted in FIG. 10 are notches (60), which are utilized, e.g., in FIGS. 16A and 16B to latch the stylus (2) within an electronic device (1).

FIG. 11 details the same stylus of FIG. 10 but depicts both the rotatable element (10 and 27) being rotated slightly. Accordingly, rotation of feature (10) and rotation along path C are clearly defined, enabling these components to rotate to allow for additional features for the device.

Figures 13, 14, 15:
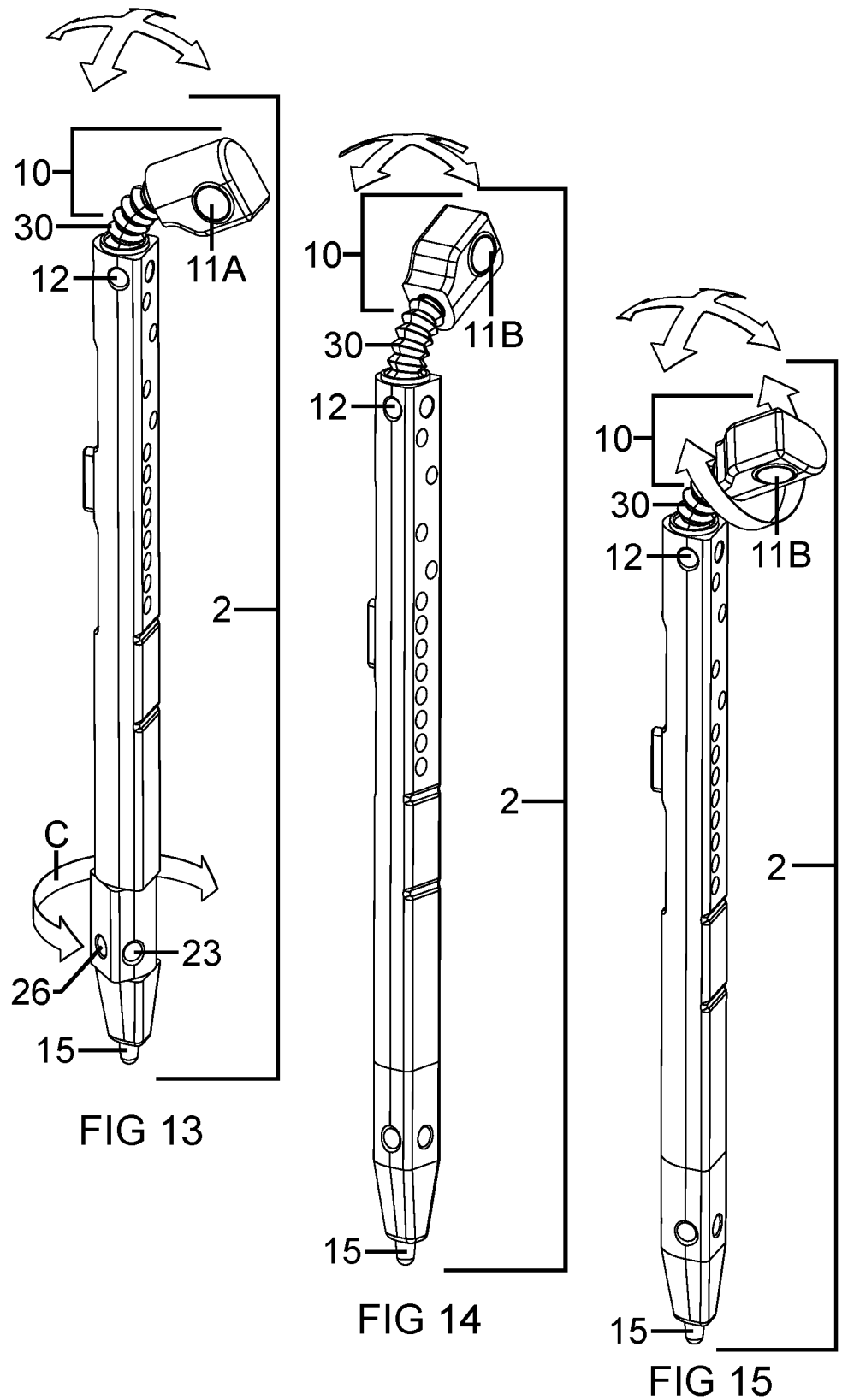
FIG. 13 depicts a stylus having an accordion like head and with a rotatable tip component.
FIG. 14 depicts a different view of the stylus of FIG. 13.
FIG. 15 depicts a different view of the stylus of FIG. 13.

FIG. 12 provides a further example of the movement of the stylus (2), wherein the rotatable element (10) moves apart from the stylus body in a vertical manner, with an accordion like (30) neck. This accordion neck (30) then allows the rotatable element (10) to flex in nearly any direction. For example, such an accordion neck (30) could be used to make a hook like shape, allowing the stylus (2) to be hung, or simply angled to take a picture in a small space, to illuminate a small space, etc. For example, a person working in a vehicle engine bay, his stylus device, including one of features (11A) or (11B) as a light, could illuminate in nooks and crannies, to allow for visualization of such tight spaces. By giving a flexible head (the head being the rotatable element [10]), new uses and expanded capabilities are provided to the stylus. Further, an image could be easily taken, and visualized. For example, element (11A) could be a camera and the user could snap images, which would directly appear on an electronic device tethered to the stylus (2). Furthermore, the electronic element (11A) as a camera, could take video, which the user can then visualize in real time, to evaluate an otherwise difficult to identify space. Thus, if video is being captured by (11A), and displayed on a screen of an electronic device, this would allow a user to point the stylus (2) and lens (11A) around a corner, into a small space, and then view the image on a screen on the electronic device (1). Examples of these rotations are depicted in FIGS. 13, 14, and 15, showing the rotatable element (10) being flexed at the accordion neck (30) in various directions.

FIGS. 16A and 16B depict connectivity between an electronic device (1) and the stylus (2). Indeed, the particular nature of the connections gives a unique feature to the stylus (2). For example, contact point (14) on the stylus (2) connects to and engages with sensor (32) (which is a terminal to create a connection) and thus allows for data transmission between the sensor (32) and the contact point (14) on the stylus (2). Contact point (16) also contacts with sensor (37). Similarly, the various contacts (46) and (6) are contacting with sensors (33 and 34). Depending on the particular position of the stylus (2), certain contacts, e.g., those of (46 and 6) and (14 and 16), will contact with certain sensors including those of (33, 34, 35, and 36).

FIG. 16A, as the detail of a section of FIG. 16B further depicts a processor (4), as known to those of ordinary skill in the art, which are provided in each electronic device (1). The notches (60) are provided in the stylus (2), to catch onto a latch (61) which is attached to a portion of the electronic device (1). This latch (61) allows for a snap like fit of the stylus (2) into an opening (3) of the electronic device (1). This aids in maintaining the stylus (2) in a particular location and maintains secure contact between the sensors and the various contact points.

In FIG. 16B, buttons (40 and 41) are provided. Those who use ordinary mobile telephones or tablets will recognize that many devices have such similar buttons to control certain features on the phone. These buttons have similar functionality with regard to the stylus, as when the stylus (2) is in electronic communication with the device, these buttons can activate one or more features of the stylus. In a simple example, these can perform a shutter release, turn on a light, activate several shutters at once, transmit data, turn on or off the stylus, change volume, etc. With appropriate software, such buttons can have nearly limitless functionality with regard to their impact to an electronically connected stylus (2).

Figure 17A:
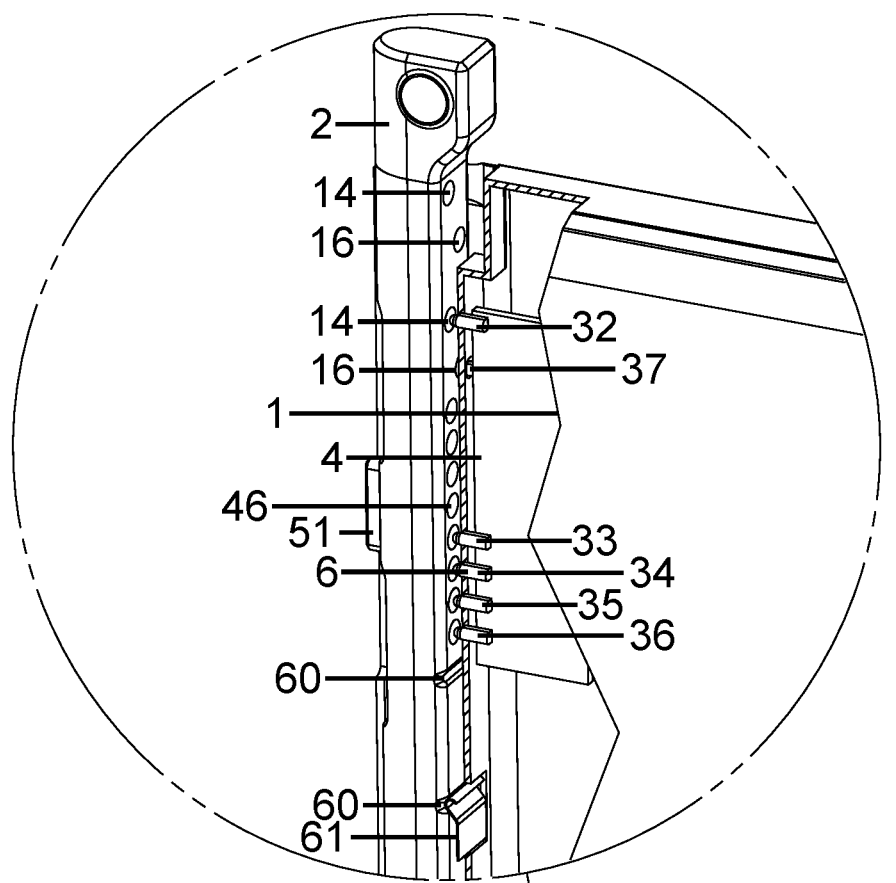
FIGS. 17A and 17B depict the stylus and electronic device of FIGS. 16A and 16B in a second position and depicting the different components that are engaged in operative communication.
Figure 17B:
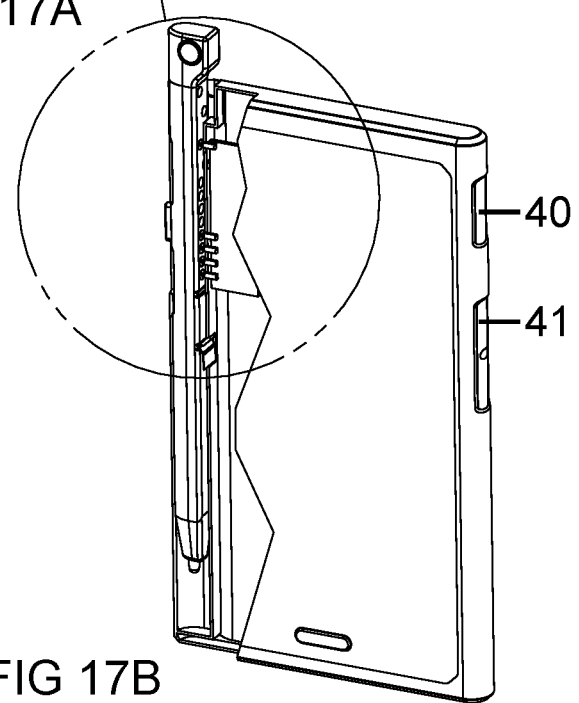

As depicted in FIGS. 17A and 17B, a detail is provided of a stylus (2) in an extended position from the electronic device (1). Accordingly, where in FIGS. 16A and 16B, the stylus (2) was secured completely into the electronic device (1), herein FIGS. 17A and 17B, the stylus (2) is extended slightly from the device. This provides that the rotatable head (10), is extended above the side wall of the top of the electronic device. Appropriately, as depicted in detail in FIGS. 9-15, this feature can then be utilized for numerous features. Accordingly, the electronic elements (11A and 11B), for example, could take pictures, shine as a light, provide a second camera, provide a second light. In certain examples, the rotatable element (10) can be extended via the accordion neck (30) and rotated to orient as necessary.

Part of the reason to allow for this extended status is that the battery and processing/computational power of the electronic device is simply greater than that possible in the small and light stylus (2). Accordingly, when docked into this first extended position, as shown in FIGS. 17A and 17B, the stylus (2) can utilize the batter from the electronic device, the memory, the storage, graphic card, and all other electrical components. Indeed, providing the stylus (2) with the numerous contact points (i.e., [14, 16, 46, and 6]) and the various sensors, including (32, 33, 34, 35, 36, and 37), as depicted in FIG. 17A, provides for multiple channels to transmit power or data, as necessary.

The notches (60) again provide for a latch (61) to catch the bottom notch (60), instead of the top notch (60) as in FIG. 16A. This again allows for a stable and secure positioning of the stylus (2) into a specific location to enable clear electronic communication between the stylus and the various sensors.

In preferred embodiments, the stylus can have clear and visible contact points on the stylus. However, with the constant improvement of materials, the contacts may be hidden under a facade layer, while still allowing for appropriate connection between the stylus (2) and the electronic device (1). The use of the notches (60) and the latch (61) aids in proper and secure positioning to provide secure fit and contact between the various components.

As a particular comparison between FIG. 17A and FIG. 16A, the stylus (2) has different contact points in contact with different sensors. This allows the electronic device (1) and the stylus (2) to clearly recognize the position and the suitable features to be utilized.

In certain embodiments, the device may comprise an executable software program or application that is launched, manually or automatically, when the stylus (2) reaches the first extended position. The various electronic communication points will identify the position and, where an application launches, control of the device can be seamlessly integrated by the user.

The positioning of the sensor components e.g., (32-37) are positioned alongside of a stylus opening (3), within a mobile computing device (1). As described, these sensors components allow for electronic communication with the stylus (2). In certain embodiments, the sensors (32-37) are merely electrical contacts that can transmit information from the stylus (2) to a processor (4) within the electronic device. In certain embodiments, the sensors (32-37) would be extended into the stylus opening to ensure direct contact with the electronic contact points (14, 16, 4, and 46) on the stylus (2). In certain other embodiments, the sensors (32-37) could be compressible sensors, having an attached spring pin (e.g., see FIG. 19), which would press into the stylus opening (3) to contact the stylus, and compress them when the stylus (2) was in position.

In certain embodiments, the rotatable component (10), being above the rim of the device (1), can freely rotate to take images across a full 360 degrees. However, with only the rotatable component (10) feature being above the rim of the device (1), taking pictures with the rotatable component (10) requires pressing one of several buttons on the device (1) itself. For example, in this position, a home button, one of the auxiliary buttons on the electronic device (1) itself would serve as the shutter release.

The functionality of each of the buttons and components can be determined based on the particular model or need for the particular application. Alternatively, a user can have several different styli, each having different features. Preferably a single stylus is tethered to the electronic device at a given time.

Communications between the stylus and the electronic device are through both direct contact of the stylus to the electronic device, e.g., through contact points (14, 16) on the stylus, as well as points (32-37) on the device itself. Furthermore, wireless connectivity means, including, but not limited to WiFi, Bluetooth, and the like link the stylus to the electronic device.

The connectivity is generated through suitable software run on the stylus and the electronic device. Suitable software and operating systems, including but not limited to iOS, Android, Blackberry, and Windows, allow for connectivity and interaction between the stylus and the electronic device.

Another embodiment will open a camera application when the stylus (2) is in a first extended position, such as in FIG. 17B, so that the stylus and the rotatable component (10) will serve as the primary camera taking pictures through lens (11A).

A stylus may have a third or more different positions extended from the electronic device. For example, FIGS. 2, 7, and 18B, each depict where the stylus (2) is not completely separated from the electronic device but is extended beyond just the rotatable component (10). In these cases, additional components, e.g., operative elements (12, 22, or 23) are extended beyond the top portion of the electronic device. Here, as was previously described, the second operative element (12) can be one of several components just like the first operative element (10). For example, in one embodiment, the second operative element (12) is a second camera. When the two cameras are inline, one camera can have a narrow focal distance and the later a wider focal distance, wherein post processing of the image can be utilized to generate an image with preferred focus.

Another camera centric ability when the second operate element (12) is a second camera to have the lens (11A) facing one direction and the second operative element (12) facing in a direction about 90 degrees from the lens (11A). Actuation of the shutter in this case will take an image that provides for a wide panoramic view, by combining the two images together in post photo production.

In certain embodiments, the device (1) itself, has a third camera on the body of the device (1), or one of the several operative elements (12, 23, 24, 25, or 26) can also be a lens/camera for additional capture. Thus, in certain orientations, all two, three, four, or more cameras can take a simultaneous image of a scene and capture both panoramic images, as well as images that have multiple focal points to allow for post processing of the image to create better focused images.

One potential for such an embodiment is to allow for realtime 360-degree view of a user's position. Here, with a camera on each of four quadrants, capture of a single still image, or of video, can give a much greater panoramic view than is currently provided by software systems that require a person to slowly rotate a camera and stitch together images to create a panoramic view.

In another embodiment, the second operative element (12) is a flash. Thus, the flash can be utilized to illuminate an area so that the rotatable camera can take better images in low light situations.

In certain embodiments, the first electronic element (11A) is a light that can operate as a flash, in connection with the embedded camera on the body of the electronic device. When the stylus is deployed above the edge of the electronic device case, this light can be operated in nearly any angle.

One software feature of the various contact points between the stylus (2) and the electronic device is the ability to determine position of the stylus (2), and then to open an appropriate software program or app to utilize the stylus (2) at that particular point. It would be possible to have a first position correspond to one app, a second position correspond to a second app, and a third position or fourth or more, correspond to different apps. Thus, each app can individually identify features for use of the stylus and how such components operate based on the particular position.

In preferred embodiments, the stylus (2) is water resistant to a particular depth. The stylus can be water resistant to about 50 meters, about 10 meters, or about 3 meters. Having a water resistant stylus allows for several unique applications of the stylus. For example, the stylus can be taken under water for capturing of images under water. In certain environments that have heavy or frequent rain, the stylus can be used without concern of water or moisture entering the electronic device. Similarly, areas that have high humidity may benefit form water resistance to prevent entry of moisture or damage to the electronic components within a device. Such standards follow under the IP67 or IP68 ratings for the International protection marking IEC standard 60529.

In preferred embodiments, the stylus can be removed from an electronic device and capture images when not physically attached to the electronic device. In order to perform while separated from the electronic device, the stylus must contain a battery, a processor, memory, wireless connectivity means, and such features to allow for independent use of the stylus apart from the electronic device.

For example, the battery may be charged when the stylus is inserted into the electronic device. However, further embodiments may provide for a direct charging, either through a direct connection to an electrical charge, or via a wireless type charging, that is known to a person of ordinary skill in the art.

The processor may be any one of several microprocessors used in electronic devices that contains the processing power sufficient to run the programs for the stylus. The particular processing power and processor will be known to a person of ordinary skill in the art.

A battery will power the stylus, including the various electrical components, processor, and the like, when it is detached from the electronic device (1). Accordingly, the battery must have sufficient storage capacity to function as a flash. Accordingly, to allow the stylus to capture images, store the captured images, and to communicate with the electronic device remotely.

Memory or storage space can be hardwired to the stylus or can be modified via any one of insertable memory and storage options. Internal or hardwired memory should hold operating systems, applications, and such information necessary to run the stylus, as well as provide sufficient space for additional add on features and/or storage of images. If optional addon storage is provided, its key feature can be driven towards the storage of third-party applications, games, images, video, and the like.

Storage of remotely taken video or images can be transferred to a larger storage means via wired or wireless communication between the stylus and the electronic device. For example, the stylus (2) may be removed from the electronic device (1), and one or more images captured with the stylus. After each image is captured, the stylus may wirelessly connect with the electronic device (1) and transmit the image. In this manner, the image needs to only be stored on the stylus for a short time, until it is transmitted to the electronic device (1). The image can then be deleted from the stylus, either automatically, or manually.

Indeed, when the stylus is detached from the electronic device (1), it can connect to the electronic device with Bluetooth (or other connection means) and transmits data to the electronic device. For example, in addition to the transmission of images, the stylus may comprise other electronic elements that can transmit data. For example, an accelerometer may transmit motion, a gyroscope may transmit data regarding orientation, and a hygrometer may transmit data regarding pressure, including depth in water or atmospheric pressure. Furthermore, the data may simply be communication between the stylus (2) and the electronic device, such as the electronic device indicating to the stylus to take an image (such as a remotely operated camera), or to illuminate the light remotely.

In certain embodiments, the stylus can also remotely tether or pair to additional devices. The additional device may contain a receiver capable of physically communicating with the device, either to charge, transmit data, or for other communication between the devices, or to electronically pair or tether for transmission of data.

In certain embodiments, the stylus utilizes sensors at one or more of the points (12, 22, 11A, 11B, 23), to determine the necessary presence of a flash, and to then utilize one of said components, when a light, to generate the flash for a photograph. This flash can be done while the device is inserted into the electronic device, but at an extended position, or when the stylus is separated from the electronic device. In other embodiments, a user can manually identify the flash to be utilized.

In certain embodiments, when the stylus is removed completely from device, the chosen camera app is turned on. This allows images to be taken from the stylus or from the camera. This allows the stylus to be removed from the device, separated from the device, and even from a user, placed on a surface, and remotely taking of a photo. The electronic device serves as the remote shutter control. Conversely, the electronic device may take the photo, and the stylus serving as the remote shutter control.

The stylus can further communicate with the internal components of the electronic device, to identify position of the stylus and therefore communication with embedded apps or software to allow for seamless communication between the two devices. The embodiments identify that the stylus can serve as a second electronic device and allow for fast and easy communication between the parent electronic device and the stylus.

When the electronic elements, of the device are used as a button or sensor, these can be compressed or activated by sensory touch. Each of the elements can be optionally a sensor, button or serve as a flash, camera, or other feature in certain embodiments.

In preferred embodiments, as depicted in FIGS. 9 and 10, elements (24, 25, or 26) are a camera. Accordingly, where one of (11A, 11B, 12, 22, or 23) are a camera, there is a camera at each end of the stylus. Having a camera at each end of the stylus allows for unique opportunity to capture images from each end to allow for greater depth photos, wide angle, 3D images, and the like.

Furthermore, the implements at each end may include a micro display, similar to those in devices such as the Google Glasses, and the like. Having a micro display at each end would allow the device to be positioned horizontally, for example, in a pair of glasses, and provide a virtual reality like experience, providing 3D-style images to the user.

In preferred embodiments, at least one of the elements is an infrared camera. For example, element (12) may utilize infrared and be able to capture images in low light, or thermal capture. This camera can be utilized alone, or with other electronic elements for imagery.

When the stylus is utilized to draft, e.g., drawings on an electronic device, a setting can be generated to define a length legend. Accordingly, when drawing components, the precise length of each line segment can be generated when the line is drawn. This can be utilized to help draw things to scale, when a drawing is created by free hand. Thus, when drafting on a page, or reviewing a map, one can travel the stylus between a first location and a second location to determine distance.

In certain embodiments, software can be utilized to capture the actual map and when taking the stylus (2) from a first point to a second point, and through use of a mapping system, the device can be utilized to define the optimal travel route between those two points. This is particularly cumbersome on certain apps, wherein it is hard to pinpoint the precise address, instead the pointer (15) can be precisely indicated at a destination, and the route to such destination calculated.

Each of these features takes the ordinary stylus and turns it into a universal tool. To make the tool universal it must have the ability to both work independently of the parent device, for example a smart phone, a tablet, or a mobile computer, or to be directly connected. Many examples require that the stylus communicates information to the parent device, but other times the stylus works independently.

A point of this communication is that both the parent device and the stylus can each serve as the primary device, and communication does not simply flow in one direction, but can be passed from one device to the other in either direction. In the simplest manner, this is identified by the concept of a camera (5) on the parent device, and a shutter release on the stylus, e.g., (13). The stylus can act as the shutter release to take a picture with the camera (5) from the parent device. Similarly, buttons (not depicted) on the parent device, e.g., as depicted in FIG. 1 such as (40 and 41) can serve as the shutter release to capture an image from one or more of the cameras on the stylus. Indeed, different angles can be controlled by different shutter releases, by use of an application that identifies certain buttons with certain functionality to capture from each of the various features of the stylus.

The stylus (2) can further serve as a remote control to certain devices. For example, the tip (15), or even the receiver (28), or other feature, may allow for electrical connection to a cable box or to a remote control drone or other device, for communication between the two devices.

Accordingly, the stylus becomes not simply a drawing implement, it becomes a camera, a tool, a remote control, a virtual reality device, a 3D capturing device, etc. Combined with the power in micro size, the stylus can function alone, or together with the processing power, storage, and larger aperture sized devices as a secondary device. Applications run between the stylus and the parent device allow for almost unlimited control of each of the various components, wherein the application can indicate features to be used based on user preferences.

Finally, while the stylus can be manufactured with components in place, certain components may be replaceable or exchangeable, should upgrades be warranted. For example, rotatable heads (10 and 25) may be replaced with devices having greater or lesser features. This would allow customization of the device based on the particular desires of the end user.

Figure 18C:
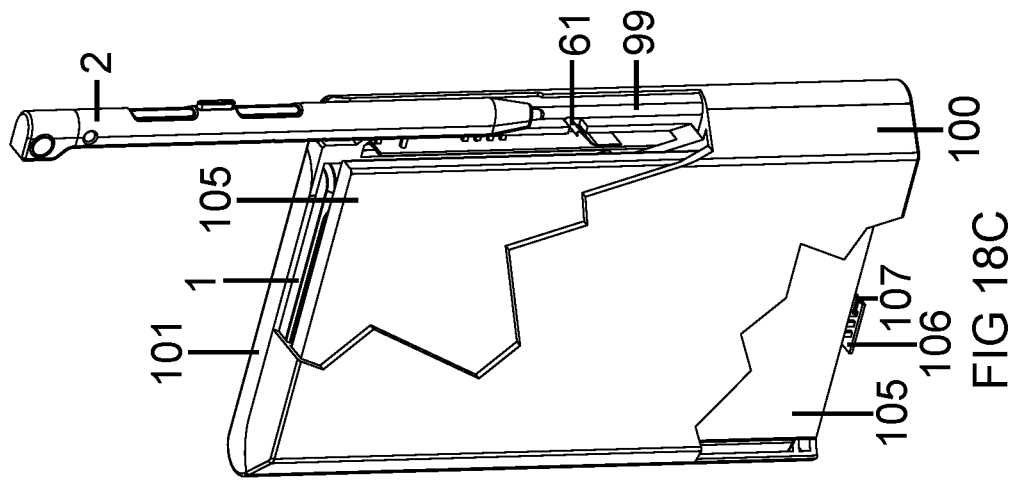
FIGS. 18A-18C depict a case device comprising a slot for accepting a stylus.
Figure 18B:
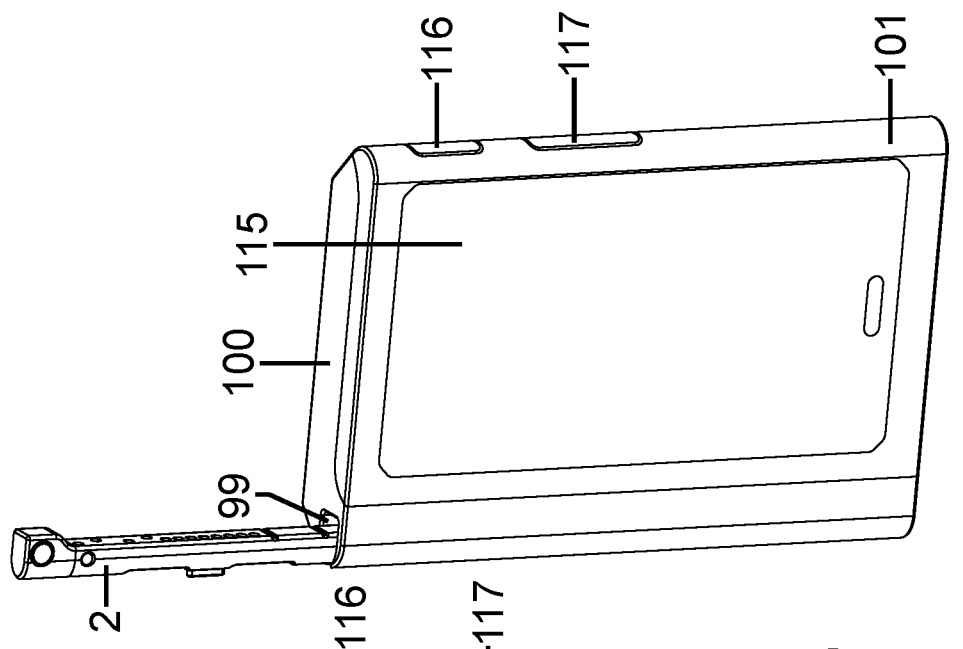
Figure 18A:
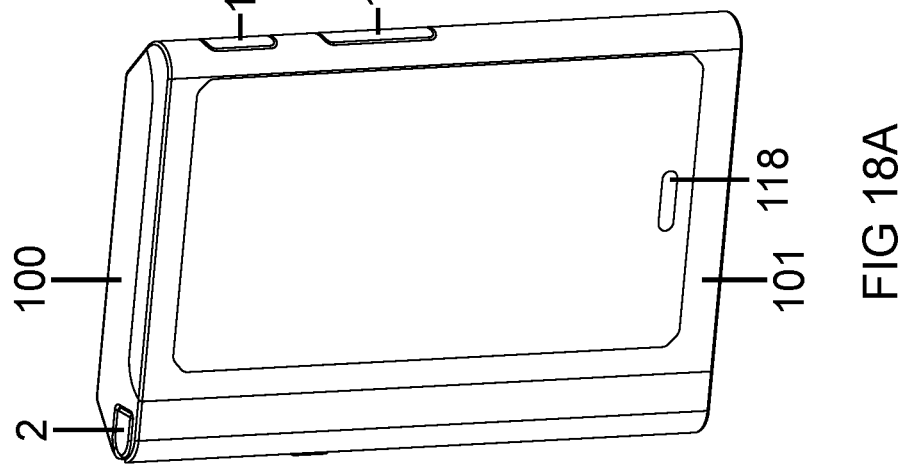

The stylus (2) can be integrated into both an electronic device (1), but also into extension devices. For example FIGS. 18A, 18B and 18C depict a rear case (100) that contains an internal battery (e.g., [105] in 18C). Many smart phone devices utilize cases that have an external battery pack. This can greatly expand the battery capacity. FIG. 18A depicts the stylus (2) within such an external case (100). The external case (100) contains an optional clear front window (115) or protective screen. This protective screen (115) can be engaged to the case front (101). Further, buttons (116, 117 and 118) contact with underlying buttons on the electronic device (1), for example connecting to buttons (40, 41, and 42) (see FIG. 3). This maintains the functionality of the underlying device, while providing battery capacity.

FIG. 18B details the stylus (2) extended from the case, and the opening (99) for receiving the stylus (2). FIG. 18C shows a partially exposed view of the case, detailing the battery (105), as well as the PCB (106), and a spring pin (107) which allows for connection between (114) in FIG. 19 and the battery (105). This allows for electronic communication between the underlying electronic device (1) and the external case (100). The latch (61) is shown to mate with a corresponding notch feature (60) on the stylus.

FIGS. 19A, 19B, and 19C provide further details for the electronic connections between the external case (100) and the electronic device (1). Here the electronic device (1) contains an electrical contact point (114) (though the position can be different for various devices). This in turn comprises a corresponding PCB (106) and spring pin (109) to connect the case (100) to the electrical contact point (114) of the electrical device (114). Within the case, along the opening (99) are provided pins (111) and (112) on the vertical PCB board (113). These various pins match those exemplified in FIGS. 16A and 16B for example, to provide for connectivity between the device and the stylus (2). Electrical connection connector (108) further is provided to ensure secure connection between the case (100) and the electronic device (1).

As depicted in FIG. 19A, the electronic device (1) fits into the case (100). Those of ordinary skill in the art recognize that numerous designs allow for entry of the device to pair with an external case for secure fit.

FIG. 20 shows the cross-sectional views through FIGS. 20A and 20B.

FIG. 20A depicts the electronic device (1) and battery (105) within the case (100). The bottom showing the electrical contact point (114), and the PCB (106) for pins (109) and (107) to connect to the components of the case (100) and the electronic device (1). The front of the case (101) is depicted with an optional plastic or glass front (115).

FIG. 20B then depicts a top cross-sectional view showing the electronic device (1) inside of a case (100). A batter (105) is at the rear of the case, and a stylus (2) fits into the opening (99) in the case (100). Buttons on the side of the case, e.g., (116), provide contact as with the normal button features (40, 41) on the side of a phone. And the front of the case (101) may contain a clear plastic or glass window (115) to protect the screen.

Accordingly, the electronic stylus (2) described herein provides a new and useful tool with multiple functionalities. In preferred embodiments, the stylus comprises a longitudinal axis having a tip (15) end and an opposing end comprising a rotatable component (10). The rotatable component comprises at least one electronic element (11A). Preferable the rotatable component (10) comprises at least two electronic elements (11A and 11B). The rotatable component (10) is connected to the body of the stylus (2) allowing it to rotate 360 degrees. In certain embodiments, the rotatable component (10) is connected via an accordion like structure, allowing not only the rotation of the rotatable component (10) but also to extend from the body of the stylus. The body of the stylus is the section between the rotatable component (10) and the tip (15). The body particularly contains at least one operative button (e.g., one of at least [13] or [35]), and at least one further electronic element. In certain embodiments, the further electronic element is place near the rotatable component (10), e.g., those of (12, 22, or 23). In other embodiments, the further electronic elements are placed near the tip (15), e.g., those of (24, 25, or 26). Where a further electronic element is placed near the tip, is its preferable placed on a section of the body that is rotatable, e.g., around the axis in the direction of "C" as in FIG. 9. Along the body of the stylus (2) is also defined a series of electrical contacts, e.g., those of (14, 16, and 46). These electrical contacts are spaced along the longitudinal axis of the stylus (2) enabling positional recognition and communication between the stylus and an electronic device, though the stylus (2) can communicate with an electronic device without direct physical contact via wireless means. Finally, the stylus (2) in certain embodiments comprises notches (60) to facilitate positional guidance within an opening. The notches (60) can be any feature that allows for communication with a corresponding component, e.g., a latch (61) to identify a proper position and assist with maintaining said position. For example, such latch (61) and notch (60) may comprise a magnetic component to assist in alignment and maintenance to said position, or simply use mechanical/friction forces to maintain the position.

In preferred embodiments, the stylus is paired with an electronic device, such as a smartphone or tablet, wherein said electronic device comprises corresponding stylus opening (or slot) for receiving the stylus. Within the stylus opening (3) are a plurality of pins or connectors, which electronically contact the various electrical contacts on the body of the stylus. Wherein the connectors (e.g., [32-37]) provide for positional information of the stylus, enabling operation of the stylus with software platforms running on the stylus or on the electronic device. With the plurality of electrical contacts on the stylus body, movement of the stylus up or down in the stylus opening enables different positions to have different electrical connections between the stylus and electronic device. The electronic device preferably comprises a latch (61) like component within the stylus opening to assist in locking or securing the stylus in a first, second, or further position, wherein each position is defined by a particular set of electrical connections between the stylus and the device.

The stylus can be completely removed from the stylus opening, and at such point, the stylus must run on its own power. Optionally, the stylus can be in wireless communication with the electronic device to continue exchange of data between the stylus and the electronic device. However, the stylus can function as a standalone component, i.e., taking photos, writing on a surface, measuring distances, illuminating areas with a light, etc. Once the stylus is reconnected into the stylus opening, the wired connection can finalize (if not already completed) the transfer of all data from the stylus to the electronic device. In this way, smaller operating electronics can be utilized in the stylus, and then paired or downloaded to the larger operating system, memory, storage, etc. of the electronic device.

A preferred embodiment comprises an electronic device comprising a stylus; said stylus comprising a first or pointed end having a touch capable compression tip, and a top end (head end), said top end comprising a rotatable element disposed of at the end of the top end, comprising a first electronic element mounted on said rotatable element and a second electronic element mounted on the opposing side of said rotatable element, a third electronic element mounted below said rotatable element; a first contact point and a second contact point disposed on said stylus between said second electronic element and said pointed end; and at least one sensing button; said stylus comprising means for electronically communicating with said electronic device. Preferably, there are a plurality of contact points, each arranged along the length of the stylus body. Preferably the stylus comprises at least one, and preferably two or more notches defined to identify an extension of the stylus from the electronic device, wherein the plurality of contact points is in contact with sensors within the electronic device. Preferably, the rotatable element is attached to the body of the stylus via an elongating accordion structure, capable of extending the head away from the body and orienting the head in a plurality of directions. Preferably at least two of the electronic elements are cameras or camera sensors capable of capturing an image, and at least one of the electronic elements is a light source.

In preferred embodiments, the stylus comprises at least four or more electronic elements, each capable of interaction with one another, thereby comprising a plurality of camera (sensors) to capture images, lights, and different type of cameras, so as to enable capture of different light sources in a single instance. Preferably, a button on the sensor or on the electronic device serves as an actuator (shutter release) to capture an image, whether this requires an actual shutter to open and close or whether this is merely performed digitally.

As described herein, the stylus is a unique tool comprising one or more electronic elements, enabling the sensor to become a standalone device apart from its parent electronic device. This enables wireless connectivity between the devices to create new opportunities for use of the stylus and creates functionality that would not be possible with existing stylus designs and technologies. Furthermore, the use of a plurality of electronic elements, whether as a light, a camera, another sensor type, another emitter, provides a tool that can capture and record data in a variety of ways that heretofore was not possible in a stylus.

What is claimed is:

1. A stylus device comprising a stylus and an external case, said external case engaged to an electronic device, said stylus having an elongated body having a tip end and a head end, said head end comprising a rotatable element comprising at least one electronic element selected from a light, a camera, or a sensor; and at least one electronic contact and at least one activating switch positioned along said elongated body; wherein said external case comprises a top, two sides, a bottom, a front, and a back, wherein one side comprises a receiving aperture capable of accepting said stylus; at least one contact point within said receiving aperture; said stylus having a first position, wherein said head end is flush to said top, at least a second position, wherein said head end is extended from said electronic device and remains in electronic communication with said electronic device, and a third position disengaged from said electronic device and in wireless communication between said stylus and said electronic device.

2. The stylus device of claim 1 wherein said at least one electronic element is a camera.

3. The stylus device of claim 1 further comprising at least a second electronic element, wherein said at least second electronic element is selected from the group consisting of: a camera, a button, a selection device, a light, a sensor, a display, and combinations thereof.

4. The stylus device of claim 1 wherein said tip end is positioned adjacent to a second rotatable element, and wherein said second rotatable element comprises at least a second electronic element.

\* \* \* \* \*